US010845902B2

(12) United States Patent
Clark et al.

(10) Patent No.: US 10,845,902 B2
(45) Date of Patent: Nov. 24, 2020

(54) TOUCH SENSOR FOR DISPLAY

(71) Applicant: Sharp Kabushiki Kaisha, Sakai (JP)

(72) Inventors: Nick Clark, Oxford (GB); Tim Michael Smeeton, Oxford (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 115 days.

(21) Appl. No.: 15/942,060

(22) Filed: Mar. 30, 2018

(65) Prior Publication Data

US 2019/0302936 A1    Oct. 3, 2019

(51) Int. Cl.
    *G06F 3/041*    (2006.01)

(52) U.S. Cl.
    CPC .. *G06F 3/0412* (2013.01); *G06F 2203/04103* (2013.01)

(58) Field of Classification Search
    CPC ......... G06F 3/0412; G06F 2203/04103; G06F 2203/04112; G06F 3/04164
    See application file for complete search history.

(56) References Cited

U.S. PATENT DOCUMENTS

| | | | | |
|---|---|---|---|---|
| 8,665,230 B2* | 3/2014 | Liu | ................ | G06F 3/044 345/173 |
| 8,922,512 B2 | 12/2014 | Cok | | |
| 8,970,537 B1* | 3/2015 | Shepelev | .......... | G06F 3/044 345/173 |
| 9,134,870 B2* | 9/2015 | Lee | .............. | G06F 3/044 |
| 9,158,420 B2* | 10/2015 | Cok | .............. | G06F 3/0412 |
| 9,342,176 B2 | 5/2016 | Kim et al. | | |
| 9,377,646 B2* | 6/2016 | Westhues | ...... | G02F 1/13338 |
| 9,459,751 B2 | 10/2016 | Weaver et al. | | |
| 9,471,167 B2 | 10/2016 | Lai et al. | | |
| 9,477,362 B2* | 10/2016 | Ono | .............. | G06F 3/044 |
| 9,547,031 B2* | 1/2017 | Weng | .......... | G01R 27/2605 |
| 9,582,124 B2* | 2/2017 | Han | .............. | G06F 3/0445 |
| 9,658,726 B2* | 5/2017 | Rowe | ............ | G06F 3/0416 |
| 9,696,835 B2 | 7/2017 | Her | | |
| 9,746,973 B2* | 8/2017 | Wang | .......... | G06F 3/044 |

(Continued)

OTHER PUBLICATIONS

Clark et al., "Touch Sensor Feedlines for Display", U.S. Appl. No. 15/942,036, filed Mar. 30, 2018.

(Continued)

*Primary Examiner* — Nitin Patel
*Assistant Examiner* — Robert M Stone
(74) *Attorney, Agent, or Firm* — Keating & Bennett, LLP

(57) ABSTRACT

A display device includes a display panel including a plurality of sub-pixels, a touch sensor electrode made of a conductive and opaque material that is located directly on the display panel and overlaps a portion of the display panel in between a portion of the plurality of sub-pixels, a feedline that is made of the conductive and opaque material and connected to the touch sensor electrode, overlaps a portion of the display panel in between a portion of the plurality of sub-pixels that is not overlapped by the touch sensor electrode, and routes the touch sensor electrode to a touch sensor controller, and a feedline extension that is made of the conductive and opaque material, extends from the feedline and overlaps a portion of the display panel in between a portion of the plurality of sub-pixels that is not overlapped by the touch sensor electrode and the feedline.

6 Claims, 8 Drawing Sheets

(56) References Cited

U.S. PATENT DOCUMENTS

| | | | | |
|---|---|---|---|---|
| 10,133,402 B2* | 11/2018 | Liu | | G02F 1/134309 |
| 10,365,744 B2* | 7/2019 | Lee | | G06F 3/044 |
| 10,372,258 B2* | 8/2019 | Pan | | G06F 3/0445 |
| 2007/0074914 A1* | 4/2007 | Geaghan | | G06F 3/044 |
| | | | | 178/18.06 |
| 2008/0129898 A1* | 6/2008 | Moon | | G06F 3/0412 |
| | | | | 349/12 |
| 2009/0213090 A1* | 8/2009 | Mamba | | G06F 3/044 |
| | | | | 345/174 |
| 2010/0123670 A1* | 5/2010 | Philipp | | G06F 3/044 |
| | | | | 345/173 |
| 2010/0163394 A1* | 7/2010 | Tang | | H03K 17/9622 |
| | | | | 200/600 |
| 2010/0214247 A1* | 8/2010 | Tang | | H03K 17/98 |
| | | | | 345/173 |
| 2010/0220075 A1* | 9/2010 | Kuo | | G06F 3/0446 |
| | | | | 345/174 |
| 2011/0102361 A1* | 5/2011 | Philipp | | G06F 3/044 |
| | | | | 345/174 |
| 2011/0273401 A1* | 11/2011 | Moriwaki | | G06F 3/047 |
| | | | | 345/174 |
| 2012/0044202 A1* | 2/2012 | Ishizaki | | G02F 1/13338 |
| | | | | 345/174 |
| 2012/0229414 A1* | 9/2012 | Ellis | | G06F 3/044 |
| | | | | 345/174 |
| 2012/0268418 A1* | 10/2012 | Ishizaki | | G06F 3/0412 |
| | | | | 345/174 |
| 2013/0082964 A1* | 4/2013 | Agari | | G06F 3/044 |
| | | | | 345/173 |
| 2013/0127769 A1* | 5/2013 | Guard | | G06F 3/044 |
| | | | | 345/174 |
| 2013/0127775 A1* | 5/2013 | Yilmaz | | G06F 3/044 |
| | | | | 345/174 |
| 2013/0154996 A1* | 6/2013 | Trend | | G06F 3/044 |
| | | | | 345/174 |
| 2013/0207911 A1* | 8/2013 | Barton | | H01B 5/14 |
| | | | | 345/173 |
| 2013/0222325 A1* | 8/2013 | Cok | | G06F 3/044 |
| | | | | 345/174 |
| 2013/0242485 A1* | 9/2013 | Ohtani | | G06F 3/041 |
| | | | | 361/679.01 |
| 2013/0278513 A1* | 10/2013 | Jang | | G06F 3/047 |
| | | | | 345/173 |
| 2013/0285975 A1* | 10/2013 | Hong | | G06F 3/044 |
| | | | | 345/174 |
| 2014/0051318 A1* | 2/2014 | Cok | | G06F 3/044 |
| | | | | 445/24 |
| 2014/0085251 A1* | 3/2014 | Cok | | G06F 3/044 |
| | | | | 345/174 |
| 2014/0111709 A1* | 4/2014 | Kim | | G02F 1/13338 |
| | | | | 349/12 |
| 2014/0210784 A1* | 7/2014 | Gourevitch | | H03K 17/962 |
| | | | | 345/174 |
| 2014/0225859 A1* | 8/2014 | Badaye | | G06F 3/0446 |
| | | | | 345/174 |
| 2014/0332256 A1* | 11/2014 | Cok | | H05K 1/0274 |
| | | | | 174/253 |
| 2014/0375605 A1* | 12/2014 | Ootani | | G06F 3/0412 |
| | | | | 345/174 |
| 2015/0002458 A1* | 1/2015 | Lee | | G06F 3/0418 |
| | | | | 345/174 |
| 2015/0253898 A1* | 9/2015 | Kim | | G06F 3/044 |
| | | | | 345/174 |
| 2015/0309625 A1* | 10/2015 | Huang | | G06F 3/0418 |
| | | | | 345/174 |
| 2015/0370356 A1* | 12/2015 | Hwang | | G06F 3/041 |
| | | | | 345/173 |
| 2016/0109977 A1* | 4/2016 | Hashimoto | | G06F 3/044 |
| | | | | 345/174 |
| 2016/0202789 A1* | 7/2016 | Kim | | G06F 3/044 |
| | | | | 345/174 |
| 2016/0259444 A1* | 9/2016 | Yang | | G06F 3/0412 |
| 2016/0313853 A1* | 10/2016 | Liou | | G06F 3/0443 |
| 2016/0342256 A1* | 11/2016 | Zhou | | G06F 3/0443 |
| 2017/0115801 A1* | 4/2017 | Shih | | G06F 3/0416 |
| 2017/0220163 A1* | 8/2017 | Kurasawa | | G06F 3/0412 |
| 2018/0188858 A1* | 7/2018 | Zhang | | G09G 5/04 |
| 2019/0146608 A1* | 5/2019 | Lee | | G06F 3/044 |
| | | | | 345/174 |
| 2019/0212836 A1* | 7/2019 | Kadowaki | | G06F 3/03545 |
| 2019/0302935 A1* | 10/2019 | Clark | | H01L 27/3276 |
| 2019/0302959 A1* | 10/2019 | Clark | | G06F 3/0412 |
| 2019/0354239 A1* | 11/2019 | Nakayama | | G06F 3/0448 |

OTHER PUBLICATIONS

Clark et al., "Touch Sensor for Display With Shield", U.S. Appl. No. 15/942,049, filed Mar. 30, 2018.

Clark et al., "Touch Sensor for Display With Improved Viewing Angle Uniformity", U.S. Appl. No. 15/942,064, filed Mar. 30, 2018.

\* cited by examiner

TOUCH SENSOR FOR DISPLAY

BACKGROUND OF THE INVENTION

1. Field of the Invention

The present invention is directed to a touch sensor for an electronic display system. More specifically, the present invention relates to a self-capacitive touch sensor provided directly on an electronic display panel and a method of fabricating the same.

2. Description of the Related Art

An electronic display is a device, panel, or screen that visually presents images, text, or video that is transmitted electronically. Examples of electronic displays are used as components in televisions, computer monitors, digital signage, smart phones, and tablet computers. Display devices can either emit light, i.e., emissive type, or modulate light, i.e., non-emissive type.

An organic light emitting-diode (OLED) display device is an emissive type electronic display that includes an organic light emitting display panel and driver electronics to control the organic light emitting display panel. The organic light emitting display panel includes a matrix of sub-pixels with each sub-pixel including an organic light emitting-diode and a driving thin-film transistor (TFT). OLED displays are multi-color with a wide viewing angle, high contrast, and fast response speed.

An OLED display panel includes a pixel layer having colored sub-pixels, typically a combination of red, green, and blue (R, G, B). The pixel layer is typically constructed with two electrodes and an organic light-emitting layer between the two electrodes. The two electrodes include an anode electrode and a cathode electrode, which are applied with different voltages. The pixel layer is usually protected by an encapsulation or sealing layer that may include multiple thin layers or a sealing substrate.

A liquid crystal display (LCD) is a non-emission type display that includes a liquid crystal panel and driver electronics to control the liquid crystal panel. LCD panels include a series of cells that can each be driven independently to modulate input light. An active-matrix liquid-crystal display (AMLCD) includes a matrix of cells or sub-pixels with each sub-pixel including a switching TFT. The TFTs store the electrical state of each sub-pixel on the display while all the other sub-pixels are being updated. The sub-pixels typically include a corresponding red, green, or blue color filter driven in combination to form a color gamut.

A typical LCD includes an array substrate including the TFTs and connecting signal lines, an opposing substrate including the color filter, and a liquid crystal layer in between the two substrates. The driving electronics are used to create a voltage potential between a pixel electrode and a common electrode at each pixel to modulate adjacent liquid crystals in the liquid crystal layer.

The OLED display and LCD are increasingly popular, but other pixelated emissive and non-emissive type electronic display technologies are also well known.

Touch screens are widely used with electronic displays, especially for smart phones and mobile electronic devices. A touch screen is an input device that can be joined with an electronic display device to facilitate user interaction and control. Such devices typically include a touch sensor mounted on a surface of an electronic display that displays interactive information and control electronics to interpret a touch on the touch sensor.

Touch screen devices detect the location of an external touch or gesture of a finger, stylus, or similar object that occurs at or near the surface of the touch sensor. Such touch screens include a matrix of transparent conductive elements or electrodes that form a touch sensor that overlay the display device and separate control electronics to determine the location of the touch object near or in contact with the touch sensor. Touch sensors are typically transparent so the user can view displayed information on the display device through the touch-sensor. By physically touching, or nearly touching, the touch sensor in a location associated with displayed information, a user can select an operation associated with the displayed information. The touch sensor detects the touch and then electronically interacts with the control electronics, or controller, to determine and output the touch location. The output signal of the touch location is input to a processor that associates the touch location or gesture with the displayed information to execute a programmed task associated with the displayed information as a graphic user interface.

Touch screens can use a variety of technologies, including resistive, inductive, capacitive, acoustic, piezoelectric, and optical to locate a touch or gesture on a sensor.

Capacitive touch-screens are of at least two different types: self-capacitive and mutual-capacitive. Self-capacitive touch-screens use an array of transparent electrodes on the sensor in combination with the touching object to form a temporary capacitor, a capacitance of which is detected. Mutual-capacitive touch-screens use an array of transparent electrode pairs that form capacitors, a capacitance of which is affected by the touching object. In both types, each capacitor in the array is sensed to detect a touch, and the physical location of the touch-detecting electrode in the touch-screen corresponds to the location of the touch.

As mentioned, touch sensors are typically transparent or formed to be invisible to the user and minimize optical distractions and artifacts. While interacting with the display panel, the touch sensor should minimize ambient reflection, maximize display transmission, not interfere with display viewing angle, and not cause any Moiré patterns or other optical interference effects. Electrically, the touch sensor should be highly conductive and uniform to maximize sensitivity and minimize voltage potential gradients. Touch sensors are either transparent conductive materials or conductive elements that are spaced apart and are too small to be seen by the user.

A typical transparent touch sensor includes a patterned coating of a conventional transparent conducting material (TCM) such as a transparent conducting oxide (TCO) or indium tin oxide (ITO). Disadvantages of such designs include limited transparency and conductivity and increased sensitivity to mechanical or environmental stress. Thicker layers of conventional TCM increase conductivity and resistance to stress but reduce the transparency of the electrodes.

For increased conductivity and to overcome issues of touch sensors made from conventional TCM, touch sensors can be made from grid patterns of fine metal wires, meshes, or conductive traces. These micro-wires are opaque, but are meant to be fine enough and spaced apart so that they are normally not detectable by the user. Although more uniformly conductive than conventional TCM designs, patterns of micro-wire electrodes can visibly interact with pixels in a display and cause Moiré patterns and other optical interference artifacts.

In order to reduce the device thickness as much as possible, the touch sensor can be formed directly on the display, and the display and touch sensor can be manufactured in the same process. This can result in the reduction of production costs compared with production of the display and touch sensor as separate components and subsequently combining them together. However, because a manufacturing defect in the touch sensor results in the wasted production of the display, features that increase the manufacturing yield of the touch sensor are advantageous.

SUMMARY OF THE INVENTION

To overcome the problems described above, a preferred embodiment of the present invention provides a display device including a display panel including a plurality of sub-pixels; a touch sensor electrode made of a conductive and opaque material that is located directly on the display panel and overlaps a portion of the display panel in between a portion of the plurality of sub-pixels; a feedline made of the conductive and opaque material that is connected to the touch sensor electrode, overlaps a portion of the display panel in between a portion of the plurality of sub-pixels that is not overlapped by the touch sensor electrode, and routes the touch sensor electrode to a touch sensor controller; and a feedline extension made of the conductive and opaque material, extending from the feedline and overlapping a portion of the display panel in between a portion of the plurality of sub-pixels that is not overlapped by the touch sensor electrode and the feedline.

Another preferred embodiment of the present invention provides a display device including a display panel including a plurality of sub-pixels; a touch sensor electrode made of a conductive and opaque material that is located directly on the display panel and overlaps a portion of the display panel in between a portion of the plurality of sub-pixels; a feedline made of the conductive and opaque material, connected to the touch sensor electrode, overlapping a portion of the display panel in between a portion of the plurality of sub-pixels that is not overlapped by the touch sensor electrode, and routing the touch sensor electrode to a touch sensor controller; and a dummy electrode made of the conductive and opaque material and overlapping a portion of the display panel in between a portion of the plurality of sub-pixels that is not overlapped by the touch sensor electrode and the feedline.

Another preferred embodiment of the present invention provides a display device including a display panel including a plurality of sub-pixels; a touch sensor electrode made of a conductive and opaque material that is located directly on the display panel and overlaps a portion of the display panel in between a portion of the plurality of sub-pixels; an enhancement electrode, made of the conductive and opaque material, and overlapping a portion of the display panel in between a portion of the plurality of sub-pixels that is not overlapped by the touch sensor electrode; a first feedline, made of the conductive and opaque material, connected to the touch sensor electrode, overlapping a portion of the display panel in between a portion of the plurality of sub-pixels that is not overlapped by the touch sensor and the enhancement electrode, and routing the touch sensor electrode to a touch sensor controller; and a second feedline, made of the conductive and opaque material, connected to the enhancement electrode, overlapping a portion of the display panel in between a portion of the plurality of sub-pixels that is not overlapped by the touch sensor electrode, the enhancement electrode, and the first feedline, and routing the enhancement electrode to the touch sensor controller.

Another preferred embodiment of the present invention provides a display device including a display panel including a plurality of sub-pixels; a touch sensor electrode that is made of a conductive and opaque material that is located directly on the display panel and overlaps a portion of the display panel in between a portion of the plurality of sub-pixels; and a feedline that is made of the conductive and opaque material that is connected to the touch sensor electrode, overlaps a portion of the display panel in between a portion of the plurality of sub-pixels that is not overlapped by the touch sensor electrode, and routes the touch sensor electrode to a touch sensor controller; wherein the feedline includes a serpentine or zig-zag pattern in between adjacent sub-pixels of the plurality of sub-pixels.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1A:
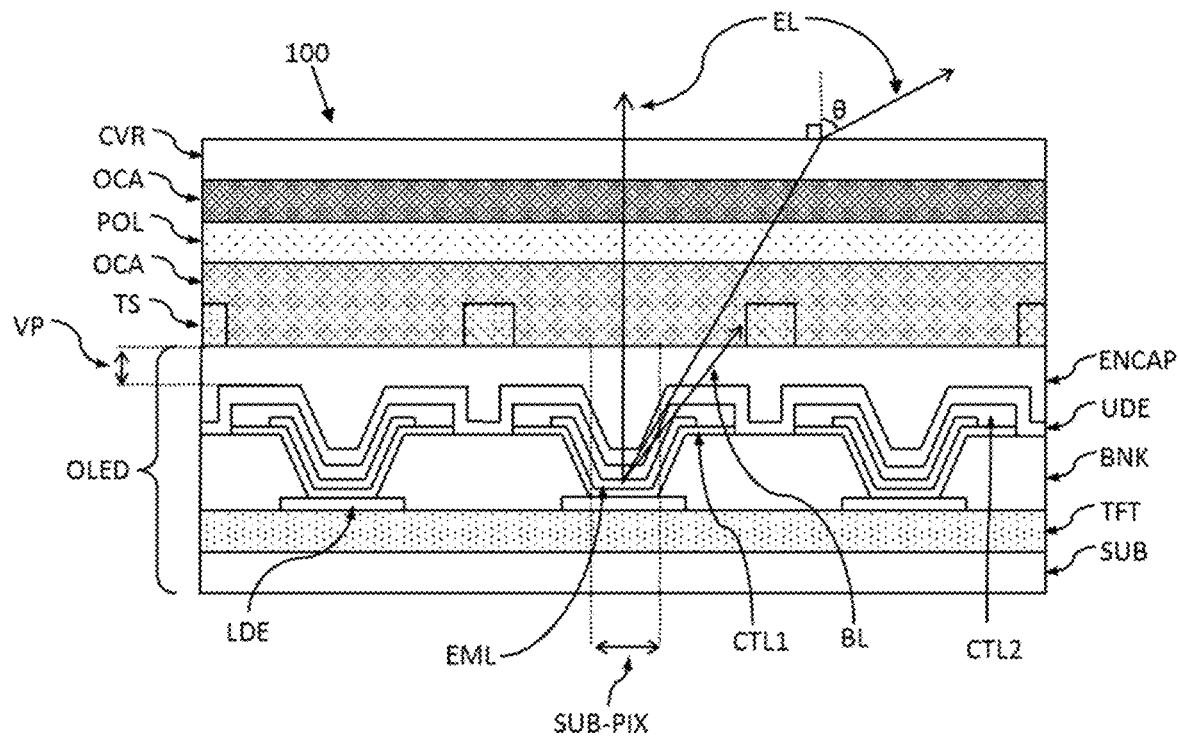
FIG. 1A is a side view of a representative portion of an OLED display panel and a touch sensor according to a preferred embodiment of the present invention.

Preferred embodiments of the present invention provide self-capacitive touch sensors for use with electronic displays. In a preferred embodiment of the present invention, a touch sensor pattern layer can be formed directly on the encapsulation layer of an OLED pixel layer or a substrate of an LCD closest to the sub-pixels and connected to a touch sensor controller to detect an external touch input. For convenience, the touch sensors of various preferred embodiments of the present invention will be described below with respect to an OLED display, but one of ordinary skill in the art will appreciate that the present touch sensors can be used with LCDs or any suitable electronic display technology.

A display panel includes a collection of sub-pixels on a TFT substrate covered with a continuous transparent encapsulation material or substrate. A touch sensor includes a collection of touch electrodes and associated feedlines which connect the touch electrodes to a touch sensor controller. This creates a touch system that detects the position, in up to 3 dimensions, of a touch object relative to the display. The assembly of both the display panel and the touch sensor is referred to as the display device.

As noted above, self-capacitive operation means that the capacitance of an electrode is measured between the touch electrode and a ground, a reference voltage of the touch sensor controller, or another portion of a display. In a mutual-capacitive operation, the capacitance is measured between different touch electrodes. Self-capacitive designs have the advantage of being more sensitive than mutual-capacitive designs.

Rather than combining two separate display panel and touch sensor components, the touch sensors of preferred embodiments of the present invention can be formed or disposed directly on the display panel to significantly reduce or minimize thickness.

A number of challenges and design requirements exist when developing a touch sensor for operation with an electronic display. The touch sensor wiring and an adjacent electrode of the display panel can create a parasitic capacitance. By reducing the distance between a touch electrode or feedline and an electrode of the display, electromagnetic forces between the touch electrode or feedline and the electrode of the display panel will generate increased parasitic capacitance. This can be best illustrated by the well-known parallel plate capacitor equation, $C=\varepsilon A/d$ where, d is the distance between the touch electrode or feedline and the display electrode at the reference potential, $\varepsilon$ is the permittivity of the dielectric separating the touch electrode, and A is the area overlapping between the touch electrode or feedline and the display electrode at the reference potential. A touch sensor formed directly on an OLED display is therefore susceptible to high parasitic capacitances. In particular, the OLED cathode electrode may be formed directly below the encapsulation layer and only separated from the touch electrodes and feedlines by, for example, 10 μm. This distance is shown as the vertical proximity VP in FIG. 1A.

It is advantageous to significantly reduce or minimize parasitic capacitance that is created between the touch sensor electrode and a closest electrode of the OLED sub-pixel. First, the touch electrode and the feedline that connects the touch electrode to the touch sensor controller form a series resistor-capacitor (RC) circuit where the voltage across the capacitor has an exponential response with a time-constant related to the RC. Therefore, reducing the parasitic capacitance reduces the charge time of the capacitor formed between the touch electrode and feedline and the OLED sub-pixel electrode to allow faster operation. Second, many available touch sensor controllers impose limits on the size of the parasitic capacitance and by reducing the absolute parasitic capacitance, the preferred embodiments of the present invention offer the widest compatibility with available touch sensor controllers.

To allow for a wide range of user input and compatibility with modern software systems, touch sensors require the ability to simultaneously detect multiple user touches. For a self-capacitive design, this can only be achieved by sensing of individual touch electrodes. Individual electrode sensing requires that each electrode is fed by an individual feedline routed past adjacent touch electrodes. In conventional designs, owing to the low conductivity of the feedline material, the feedlines are made wide to keep their resistance low. For larger panels, the wide feedlines necessitate large spacing between touch electrodes. The increase in touch electrode pitch will reduce touch resolution.

Further, wide feedlines can necessitate use of touch electrodes of varying size to ensure sufficient space for passing feedlines and varying sizes of the touch electrodes introduces non-uniformity of parasitic capacitance and sensitivity between touch electrodes causing poor sensitivity and inconsistent touch response across the touch sensor. To reduce the difference in capacitance values or dynamic range among the touch electrodes, maintain sensitivity across the touch sensor, and minimize the complexity and cost of the touch sensor controller, it is desirable that the capacitance, the RC constant, the size of touch electrodes, and the spacing between them be controlled and uniform across the touch sensor.

It is noted that a portion of the parasitic capacitance is attributed to the touch electrode and another portion of the parasitic capacitance is attributed to its associated feedline. False detection occurs when the touch sensor incorrectly reports the detection of the touch object due to the touch object's effect on the capacitance of a feedline. That is, a change in capacitance of a feedline caused by a touch object can be wrongly interpreted as a touch to be detected at the electrode that the feedline is connected to. Therefore, for the same reasons as outlined above, it is advantageous to reduce the parasitic capacitance and the sensitivity, i.e., maximum change in capacitance on the introduction of the touch object to the feedlines.

As mentioned above, a small RC constant is desired. Therefore, it is beneficial to increase the material conductivity to reduce the resistance of the feedlines and touch electrodes. In addition to making the design more tolerant to high capacitances, higher conductivity/lower resistance materials allow for longer feedlines, larger touch sensor designs, and reduced power consumption.

With respect to optical performance of the display panel combined with the touch sensor, any light emitted by or through the display panel but blocked by the touch sensor will require more power to match the light output of a display panel without touch capability. This must be considered across the full range of viewing angles. For instance, in the case of a touch sensor including touch electrodes or feedlines of opaque material according to a preferred embodiment of the present invention, increases in the thickness of the opaque material, reduction in the horizontal proximity between the opaque material and sub-pixels, and an increase in the vertically proximity between the opaque material and sub-pixels of the display panel may cause blocking of emitted light that would otherwise be emitted, as shown for the light labelled BL in FIG. 1A. Also, any non-uniformity in the appearance, caused by both the emitted light and the reflected ambient light, of the display panel with touch sensor detracts from its optical quality.

Preferred embodiments of the present invention solve the above described problems as described in detail below.

Figure 1B:
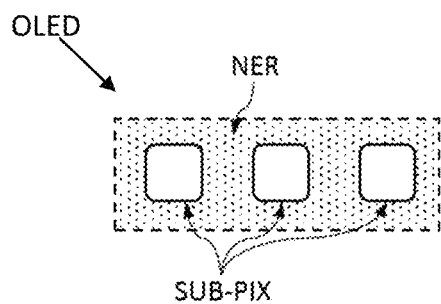
FIG. 1B is a plan view of a portion of the OLED display device of FIG. 1A.

FIG. 1A is a side view of a display device 100 including an OLED display panel OLED and touch sensor TS of a preferred embodiment of the present invention. As shown in FIG. 1A, the display device 100 includes a substrate SUB, a TFT layer TFT on the substrate SUB, a lower display electrode LDE and a bank BNK on the TFT layer TFT, an OLED sub-pixel SUB-PIX on the lower display electrode LDE, an upper display electrode UDE on the OLED sub-pixel SUB-PIX, and an encapsulation layer ENCAP covering the OLED sub-pixel SUB-PIX to define the OLED display panel OLED. FIG. 1A shows three OLED sub-pixels SUB-PIX. FIG. 1B is a plan view of the OLED display panel OLED showing three OLED sub-pixels SUB-PIX. Light is emitted from the OLED sub-pixels SUB-PIX, and regions in between OLED sub-pixels SUB-PIX are non-emissive regions NER. In FIG. 1A, the lower and the upper display electrodes LDE, UDE can include a single cathode or anode electrode or a plurality of cathode or anode electrodes. As shown in FIG. 1A, the OLED sub-pixel SUB-PIX includes charge transport layers CTL1, CTL2 and a light emitting layer EML. A conductive and opaque material is provided on the encapsulation layer ENCAP and is patterned to define the touch electrodes and feedlines of the touch sensor TS in FIG. 1A. Unless otherwise stated, all references to conductive material herein refer to electrical conductivity. Optionally, a polarizer POL and/or cover material CVR can be laminated on the touch sensor TS with optically clear adhesive OCA.

As illustrated in FIG. 1A, the touch sensor TS is preferably patterned between and does not overlap the OLED sub-pixels SUB-PIX. Therefore, there is no reduction in emitted light EL at and close to the normal viewing angle. Also, as compared with a conventional transparent touch sensor that is continuous over the display panel, the parasitic capacitance between the touch sensor TS and upper display electrode UDE is reduced due to the reduced area of the touch electrodes and feedlines. The touch electrodes and feedlines may preferably be defined in a single layer of conductive and opaque material. This allows for low cost manufacturing. The conductive and opaque material can be, for example, one of titanium, aluminum, copper, silver, gold, molybdenum, zinc, tungsten, nickel, tin, platinum, graphene, or any alloy thereof, but is not limited thereto. Optionally, the conductive and opaque material of the touch sensor TS can be a stack of multiple layers, for example, a sequence of Ti/Al/Ti layers or a combination of the other materials mentioned, but is not limited thereto. The same conductive and opaque material(s) is preferably deposited and patterned to define all of the touch electrodes and feedlines in a shared process, but different materials, deposition process and patterning process may be used for the touch electrodes and feedlines. The conductive and opaque material may be deposited by evaporative coating in a vacuum and patterned using a standard photoresist and etch process, for example, with a wet chemical etch or a reactive gas etch. Furthermore, because the touch sensor TS is preferably defined in a single layer of the conductive and opaque material, all of the conductive and opaque material is located close to the plane of the light emission from the OLED This reduces the extent of, or eliminates, blocking of light from the OLED sub-pixels SUB-PIX which would otherwise propagate at a high polar viewing angle (a polar viewing angle θ is shown in FIG. 1A). An example of a direction of blocked light BL is shown in FIG. 1A. This configuration is preferable to a configuration using conventional TCMs in thick layers because these materials are only partially transparent and cannot be used in thick layers without causing high absorption or reflection of light from the OLED sub-pixels SUB-PIX.

Preferably the conductive and opaque material has a conductivity significantly higher than that provided by conventional TCMs. Therefore, the parasitic capacitance of the touch electrodes and feedlines is lowered without increasing resistance, and preferably with reduced resistance, compared with conventional continuous TCM layers. Thus, the conductive and opaque material of touch sensors of preferred embodiments of the present invention can be very thin and narrow with low resistance.

Also, the conductivity of the conductive and opaque material of preferred embodiments of the present invention is high enough that a feedline may have a width small enough to be entirely between adjacent sub-pixels, while not overlapping with these sub-pixels. Thus, the problems associated with wide feedlines discussed above are avoided. Furthermore, increased conductivity of feedlines allows for larger designs (i.e., touch sensors on display panels with larger areas such that the feedlines connecting electrodes to a touch panel controller are long) without their resistance becoming problematically high.

Figure 2:
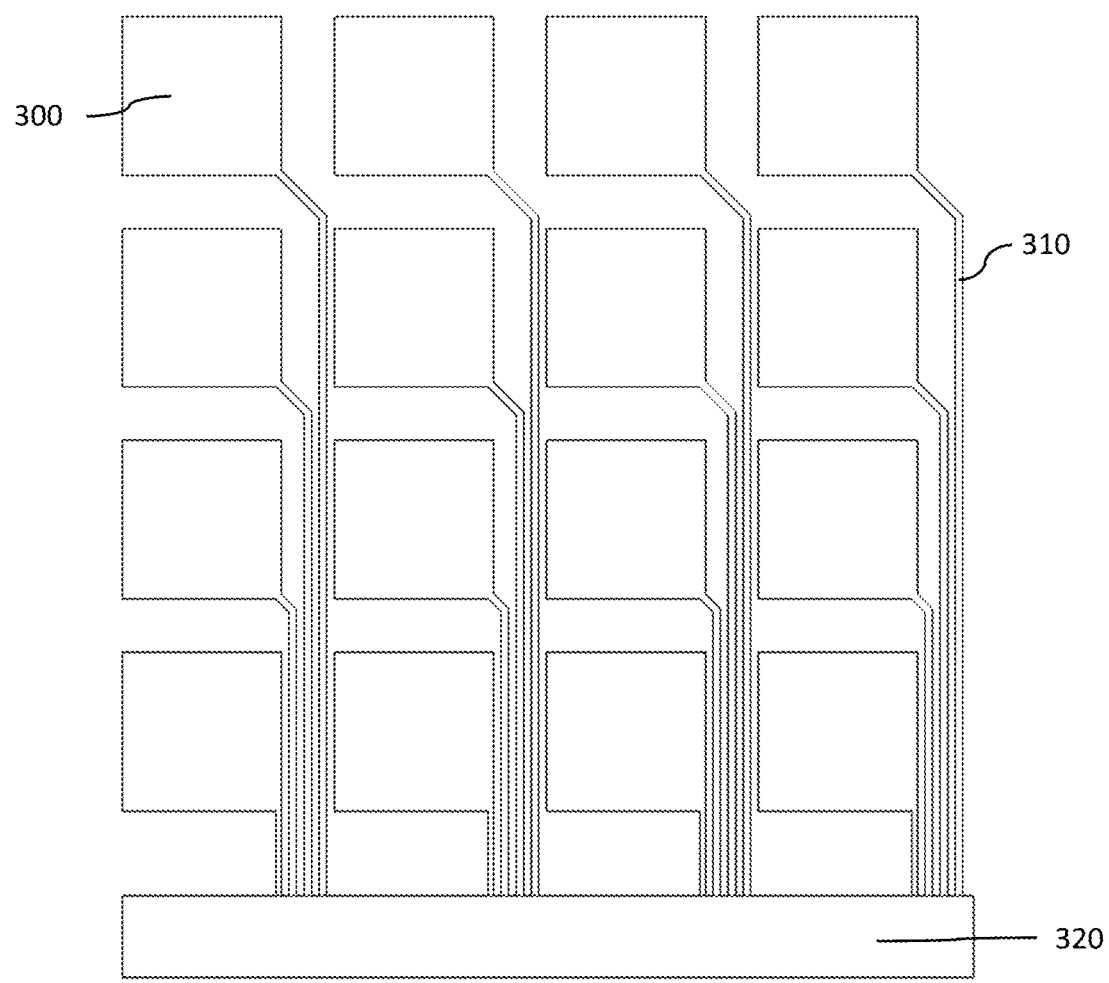
FIG. 2 is a plan view of a touch panel configuration according to a preferred embodiment of the present invention.

FIG. 2 shows an exemplary grid layout of the touch electrodes 300 with an individually connected feedline 310 according to a preferred embodiment of the present invention. The outlines of the touch electrode 300 and the connected feedline 310 in FIG. 2 indicate the outer extents of the touch electrodes 300 and feedlines 310; the structure whereby the touch electrodes 300 and feedlines 310 are not overlapping with the sub-pixels is not shown. At the sub-pixel scale, the edges of the touch electrodes 300 and feedlines 310 may not be straight lines, as in FIG. 2. In this configuration, not all of the sub-pixels of the display panel are enclosed within a touch electrode 300. As shown in FIG. 2, the feedlines 310 are routed to a touch sensor controller 320 that is at an edge of or off the display panel. The touch sensor controller 320 can be directly bonded to a substrate of the display panel or connected to the feedlines 310 using another connection method. Overall, FIG. 2 shows a self-capacitive touch sensor of a display panel made from a single layer of conductive and opaque material that has higher conductivity than conventional TCM devices, wherein the conductive and opaque material of the touch sensor does not overlap the sub-pixels.

Figure 3:
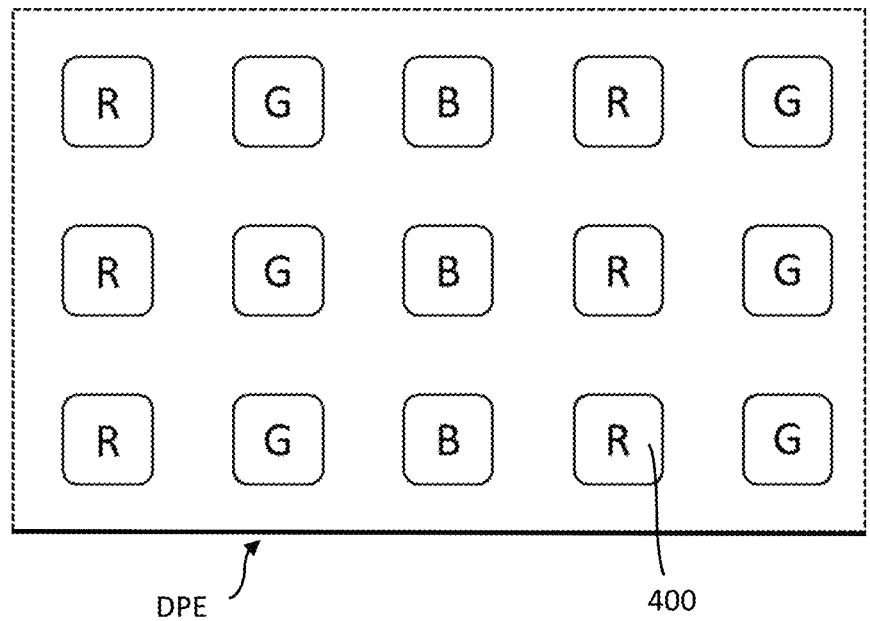
FIG. 3 shows a representative portion of the OLED display panel with a first sub-pixel distribution layout according to a preferred embodiment of the present invention.
Figure 4:
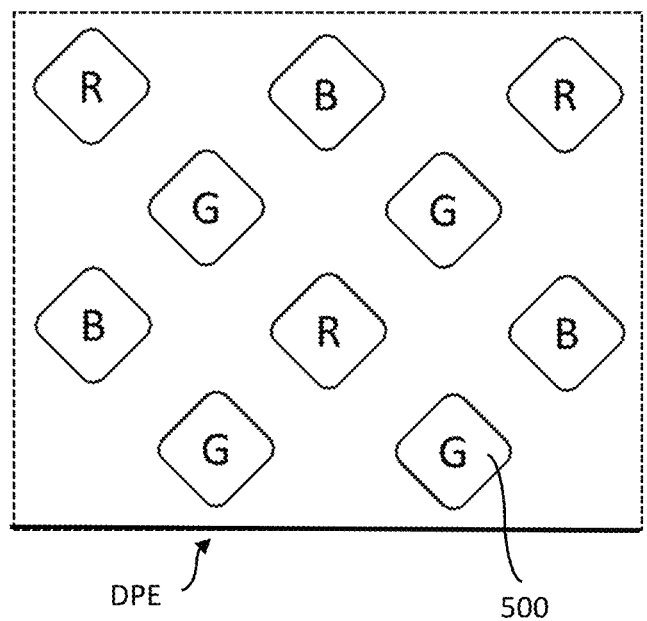
FIG. 4 shows a representative portion of the OLED display panel with a second sub-pixel distribution layout according to a preferred embodiment of the present invention.

The grid layout pattern of the touch electrodes and feedlines similar to that shown in FIG. 2 can be applied to, but is not limited to, different sub-pixel layouts and referred to as the first and second sub-pixel distributions, as shown in FIGS. 3 and 4.

FIG. 3 shows a representative portion of the OLED display panel with the first sub-pixel distribution layout where edges of the sub-pixels (R, G, B) 400 are aligned parallel or substantially parallel with a rectangular display panel edge DPE.

FIG. 4 shows a representative portion of the OLED display panel with the second sub-pixel distribution layout where edges of the sub-pixels (R, G, B) 500 are aligned at 45° with the rectangular display panel edge DPE.

In all sub-pixel distributions, the sub-pixels can be of different sizes and shapes or of equal size (e.g., red sub-pixels may be different size and shape compared with green subpixels). The sub-pixels can be grouped into one or more groups of equal size and/or the same color. For example, the sub-pixel shape may be square, rectangular, rounded, have rounded corners, curved edges, or 5 or more straight edges. One sub-pixel may include more than one separate emissive region, each of which emits substantially the same color of light, for example.

The operation of the touch sensor involves the repeated measurement, simultaneously or in-turn, of the capacitance, with respect to a touch sensor controller reference voltage or ground, of each touch electrode. Optionally, the operation of the touch sensor involves the repeated measurement, simultaneously or in turn, of the capacitance, with respect to an electrode of the OLED (preferably the upper display electrode UDE), of each touch electrode. There are various techniques to measure capacitance, including but not limited to, Charge transfer, Delta-sigma modulation, Relaxation oscillator, and Charge time measurement. All techniques will involve the application of one or many voltage (the drive voltage) pulses to the touch electrodes such that an electric field is projected from the touch electrodes.

As discussed above, when a touch object comes within close proximity to the touch electrode, the interaction of the projected electric field from the touch electrode and the touch object causes a change in charge held on the touch electrode and, therefore, a change in its capacitance. Therefore, by detecting a change in capacitance, the presence of a touching object can be determined. Because the touch electrodes are patterned in a touch sensor array on the display panel, depending on which touch electrode indicates a change in capacitance, the location of the touch on the touch sensor and display panel can be determined.

FIGS. 5A-5D show several configurations of feedlines according to preferred embodiments of the present invention. As shown in FIGS. 5A-5D, the area occupied by the feedlines is increased to include feedline extensions (shaded areas) of conductive and opaque material in locations other than just the current path between a touch electrode and the touch sensor controller. Adding area to the feedlines ensures that the coverage of the conductive and opaque regions in all areas of the display panel is similar or identical to that covered by touch electrodes and feedlines. By adding gaps between adjacent feedlines, the gaps preferably being typically less than a pitch between adjacent sub-pixels 620A (the pitch is the distance between the center of a sub-pixel and the center of an adjacent sub-pixel), and most preferably less than the width of the sub-pixel 620A, the coverage by opaque material is uniform or approximately uniform between regions of the displays with feedlines and regions of the display with touch electrodes. The result is uniform or substantially uniform reflection of ambient light and light output from the sub-pixels across the display panel. It is preferred that the average coverage of the conductive and opaque material in regions of the displays with feedlines is between about 50% and about 150% of the average coverage in regions of the display with touch electrodes, and most preferably between about 80% and about 120%. For this feature, preferably the region over which the average coverage is determined is at least an area of the display panel that includes a 2×2 array of sub-pixels. This ensures that no undesirable patterns are visible between touch electrode and feedline regions and that all areas of the display panel have similar viewing characteristics. These feedline extension features can be applied to both the first pixel distribution (e.g., FIG. 5A) and second pixel distribution (e.g., FIGS. 5B-5D) layouts.

Figure 5A:
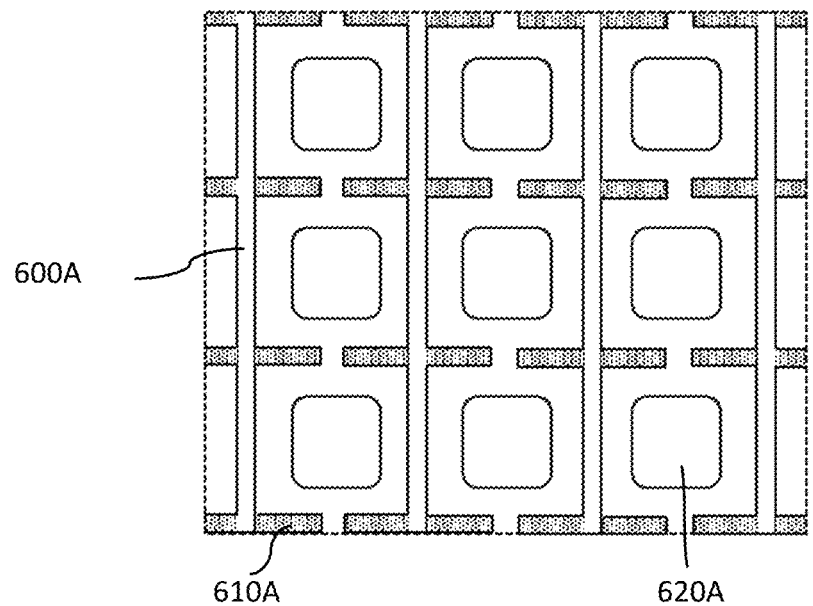
FIGS. 5A-5D show configurations of feedlines according to various preferred embodiments of the present invention.

FIG. 5A shows one preferred embodiment of the present invention that includes a representation of feedline extensions 610A (shaded areas) branching horizontally from adjacent vertical feedlines 600A (unshaded areas) with respect to the first pixel distribution pattern. FIG. 5A shows that there is a gap between adjacent horizontal feedline extensions 610A that is less than a width of a sub-pixel 620A. The unshaded area of the feedline 600A represents the current path between the corresponding touch electrode (not shown) and the touch sensor controller (not shown). The shaded area of the feedline extension 610A is additional conductive and opaque material that is connected to the feedlines 600A and patterned at the same time as the feedlines 600A. The feedline extensions 610A are not intended to be included in the current path between a touch electrode and the touch sensor controller, but are added to balance optical and lighting characteristics in portions of the display panel that do not include conductive and opaque material for a touch electrode (not shown) or a feedline 600A.

Figure 5B:
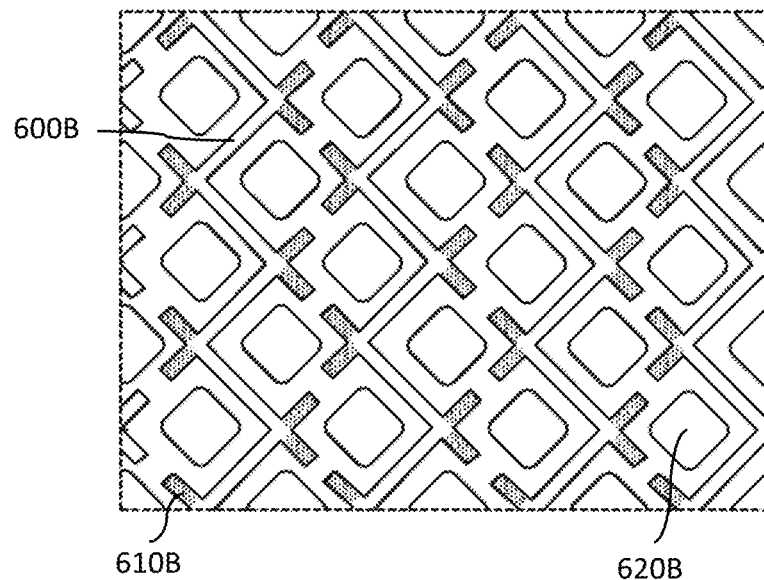

FIG. 5B shows another preferred embodiment of the present invention that includes a representation of feedline extensions 610B (shaded areas) branching from adjacent feedlines 600B (unshaded areas) with respect to the second pixel distribution pattern. In the pattern of the conductive and opaque material shown in FIG. 5B, there are feedline extensions 610B at each of the corner portions where the feedlines 600B extend in a serpentine or zig-zag arrangement around the sub-pixels. With this pattern, there are preferably gaps between adjacent feedlines 600B on two sides of the sub-pixels 620B.

Figure 5C:
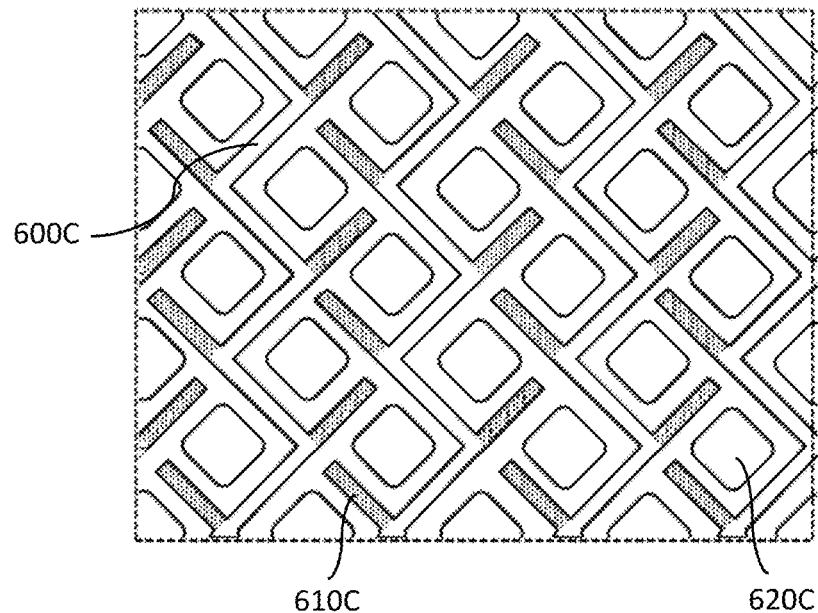

FIG. 5C shows another preferred embodiment of the present invention that includes a representation of feedline extensions 610C (shaded areas) branching from adjacent feedlines 600C (unshaded areas) with respect to the second pixel distribution pattern. Similar to that shown in FIG. 5B, in the pattern of the conductive and opaque material shown in FIG. 5C, there are feedline extensions 610C at each of the corner portions where the feedlines 600C zig-zag around the sub-pixels. However, in the pattern of the conductive and opaque material of FIG. 5C, the feedline extensions 610C preferably extend more than halfway along the width of two sides of the sub-pixels 620C.

Figure 5D:
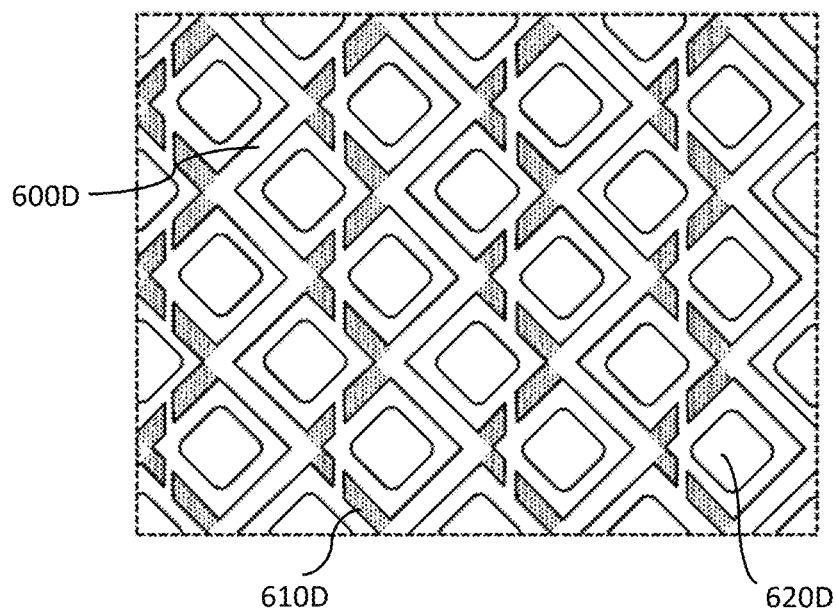

FIG. 5D shows another preferred embodiment of the present invention that includes a representation of feedline extensions 610D (shaded areas) branching from adjacent feedlines 600D (unshaded areas) with respect to the second pixel distribution pattern. Similar to that shown in FIG. 5B, in the pattern of the conductive and opaque material shown in FIG. 5D, there are feedline extensions 610D at each of the corner portions where the feedlines 600D extend in a serpentine or zig-zag arrangement around the sub-pixels 620D. However, in the pattern of the conductive and opaque material of FIG. 5D, the feedline extensions 610D are preferably configured to terminate with a slanted or angled edge (non-square) which is parallel or substantially parallel to the slanted edge of an adjacent feedline 610D across a gap. In a preferred example, the resulting gap is parallel or substantially parallel to an edge of the display panel, as in FIG. 5D.

As shown in FIGS. 5C and 5D, the conductive and opaque material patterns can each provide advantageously small differences in light output of sub-pixels at high angles as compared with equivalent sub-pixels in the touch electrode regions, while maintaining uniform ambient reflection. For example, for FIG. 5C, the gap between adjacent feedlines is near a corner of a sub-pixel 620C. The distance between the sub-pixel 620C and the conductive and opaque material may be larger close to the corners of the sub-pixel 620C than it is for locations close to the center of an edge of a sub-pixel 620C. Therefore, absence of the conductive and opaque material near to the corners of a sub-pixel 620C has less effect on the blocking of light from the sub-pixel 620C than absence of the conductive and opaque material near to the center of the edges of a sub-pixel 620C. For FIG. 5D, the overlaps between slanted edges of adjacent feedlines 600D provide similar optical appearance as if there were no absence (gap) of the conductive and opaque material. In addition, it is noted that the conductive and opaque material patterns shown in FIGS. 5C and 5D can be applied to the first pixel distribution layout.

Figure 6:
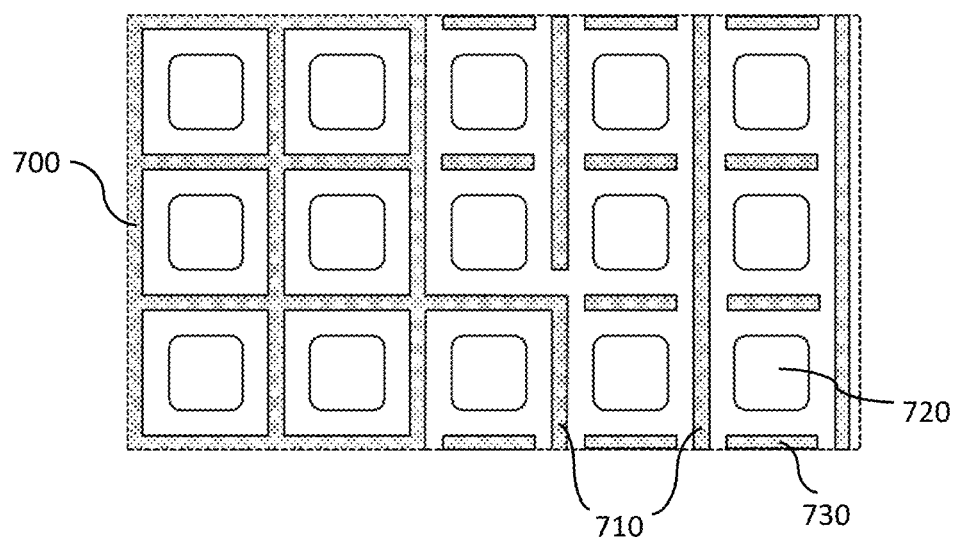
FIG. 6 shows a configuration of dummy electrodes in the first pixel distribution layout according to a preferred embodiment of the present invention.
Figure 7:
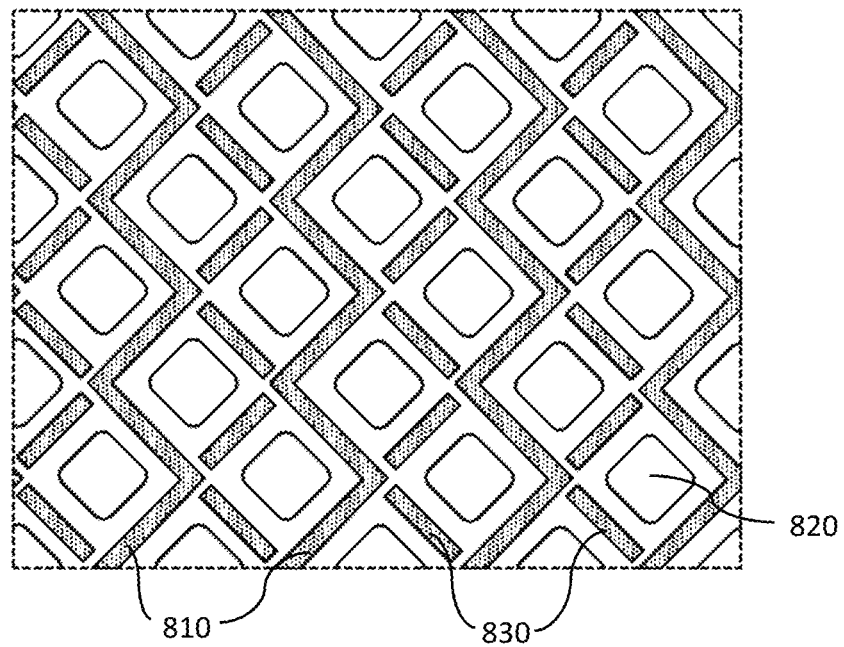
FIG. 7 shows a configuration of dummy electrodes in the second pixel distribution layout according to a preferred embodiment of the present invention.

FIGS. 6 and 7 show configurations of feedlines according to preferred embodiments of the present invention. FIGS. 6 and 7 show preferred embodiments of the present invention that include dummy or floating electrodes that are not electrically connected to any of a touch electrode, a feedline, or the touch sensor controller, for example. In these configurations, the dummy electrodes are patterned in the conductive and opaque material at the same time as the touch electrodes and feedlines. The optical result is similar to the configurations discussed above with uniform ambient reflection and light output from the sub-pixels across the display panel. This ensures that no undesirable optical patterns or artifacts are visible between touch electrode and feedline regions and that all areas of the display panel have similar viewing characteristics.

In FIGS. 6 and 7, the dummy electrodes are patterned such that the gaps between the feedlines and dummy electrodes are preferably not more than a pitch between adjacent sub-pixels, and most preferably not more than the width of a sub-pixel. This is achieved without increasing the feedline area and subsequently increasing its parasitic capacitance and increasing its touch sensitivity. In addition, because adjacent feedlines are separated by at least two narrow gaps in conductive and opaque material, the probability of a touch sensor and display panel failure, due to short circuiting between adjacent feedlines caused by a manufacturing defect (for example), is reduced. This preferred embodiment of the present invention including dummy electrodes can be applied to both the first pixel distribution (e.g., FIG. 6) and second pixel distribution (e.g., FIG. 7) layouts.

FIG. 6 shows a configuration of dummy electrodes 730 in a representative portion of the OLED display panel with the first pixel distribution layout according to a preferred embodiment of the present invention. FIG. 6 shows a touch electrode 700 connected around several sub-pixels 720 and also shows multiple feedlines 710. In addition, FIG. 6 shows multiple dummy electrodes 730 that are included in areas between sub-pixels 720 where there are no touch electrodes 700 or feedlines 710.

FIG. 7 shows a configuration of dummy electrodes 830 in a representative portion of the OLED display panel with the second pixel distribution layout according to a preferred embodiment of the present invention. Like FIG. 6, FIG. 7 shows multiple feedlines 810, and multiple dummy electrodes 830 that are patterned in between sub-pixels 820 where there are no touch electrodes or feedlines 810.

Figure 8:
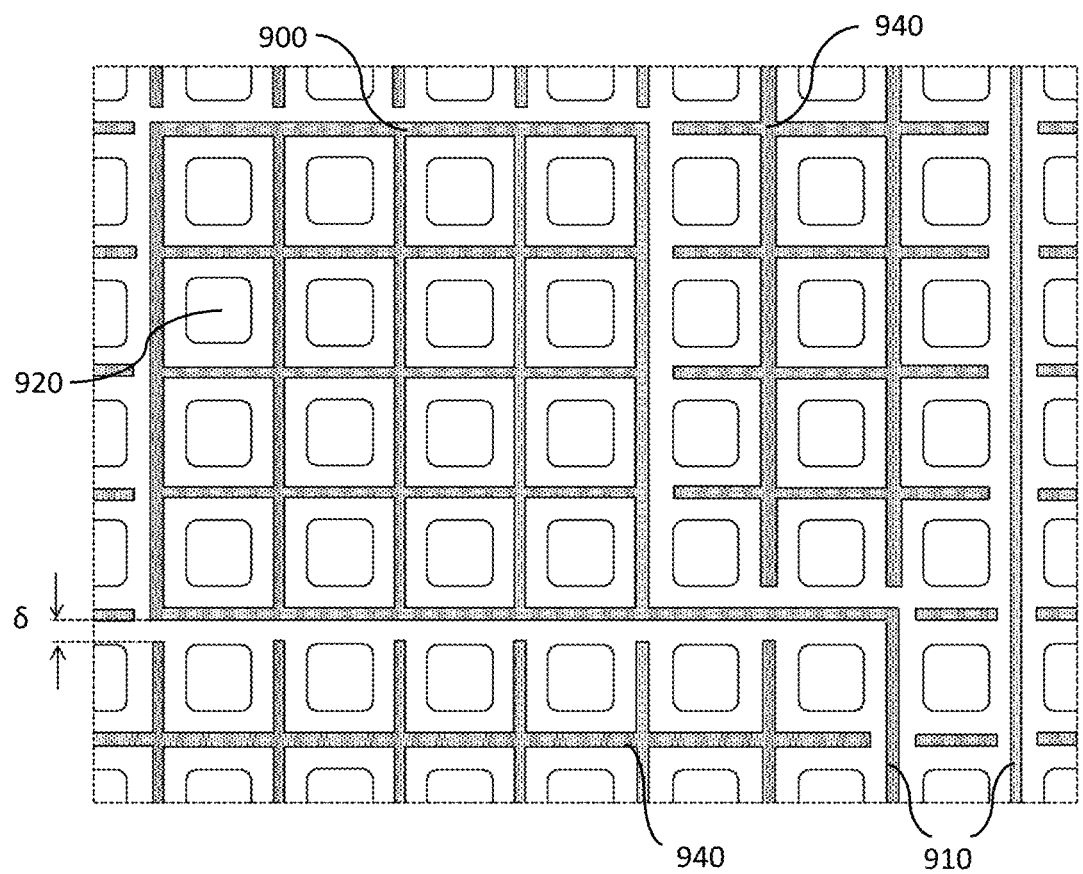
FIG. 8 shows a configuration of enhancement electrodes in the first pixel distribution layout according to a preferred embodiment of the present invention.

FIG. 8 shows a configuration of enhancement electrodes 940 in a representative portion of the OLED display panel with the first pixel distribution layout according to another preferred embodiment of the present invention. Unlike configurations described with respect to FIGS. 6 and 7, additional conductive and opaque material that is not used to define a touch electrode or feedline can be connected to the touch sensor controller and floated, grounded, or driven at a reference voltage. By applying a reference voltage to an enhancement electrode 940, the sensitivity of an adjacent touch electrode 900 can be improved due to an increased electric field projection. Additionally, driving an enhancement electrode 940 allows for simultaneous sensing of adjacent touch electrodes 900 because a distance between adjacent touch electrodes 900 is predetermined, and an electric field can project from the touch electrodes 900 and the enhancement electrodes 940 in between two adjacent touch electrodes 900. Simultaneous sensing of adjacent touch electrodes 900 is advantageous because this permits a higher touch sensing refresh rate. This is particularly beneficial for large displays with a large number of touch electrodes where a minimum refresh rate must be achieved. Furthermore, this electrical benefit is achieved without sacrificing optical uniformity because the enhancement electrodes 940 provide the same optical benefits as the dummy electrodes described above.

FIG. 8 is a plan view of a representative portion of an OLED display panel including a touch electrode 900, feedlines 910, sub-pixels 920, and enhancement electrodes 940. As shown in FIG. 8, the enhancement electrodes 940 are not connected to the touch electrode 900 or feedlines 910. FIG. 8 shows that there is a proximity gap δ between the enhancement electrodes 940 and adjacent touch electrodes 900 and feedlines 910 that is preferably no more than about a pitch between adjacent sub-pixels. Therefore, the coverage of conductive and opaque material across the display panel is uniform or substantially uniform.

Figure 10A:
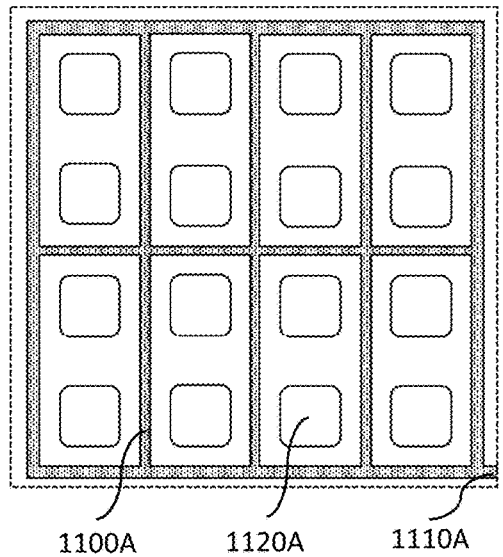
FIGS. 10A and 10B show configurations of touch electrodes in the first pixel distribution layout according to preferred embodiments of the present invention.
Figure 10B:
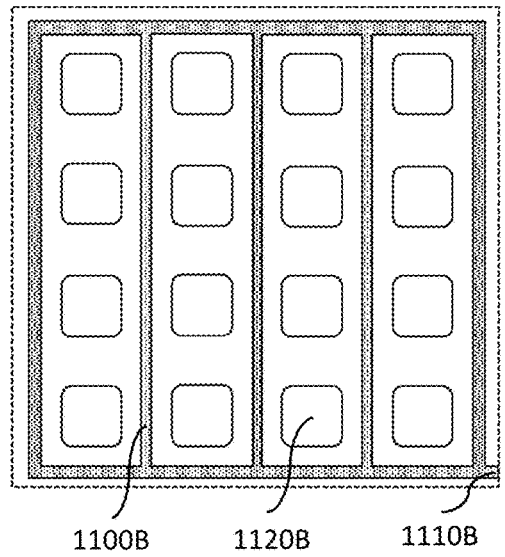

In FIG. 8, the touch electrode 900 is shown with conductive and opaque material in between a sub-pixel and every adjacent sub-pixel. In an alternative preferred embodiment, the touch electrode is preferably configured so that conductive and opaque material is not in between every pair of adjacent sub-pixels. In a first example shown in FIG. 10A, the touch electrode 1100A can surround groups of 2 sub-pixels 1120A, groups of 3 sub-pixels, or larger groups of sub-pixels with the feedline 1110A routed to the touch sensor controller. In a second example shown in FIG. 10B, columns of sub-pixels 1120B surrounded by a touch electrode 1100B can have conductive and opaque material in between only the columns, or likewise in between rows only with the feedline 1110B routed to the touch sensor controller. For the second pixel distribution layout, the touch electrode and feedlines can be routed in between columns or rows in a serpentine or zig-zig pattern if so desired. Preferably the conductive and opaque material pattern of a touch electrode is a repeated pattern so that the total coverage of material is approximately constant across the touch electrode. Configurations as in FIG. 10A and FIG. 10B may provide touch electrodes with lower parasitic capacitance than other configurations, while retaining high sensitivity to touch.

Figure 9:
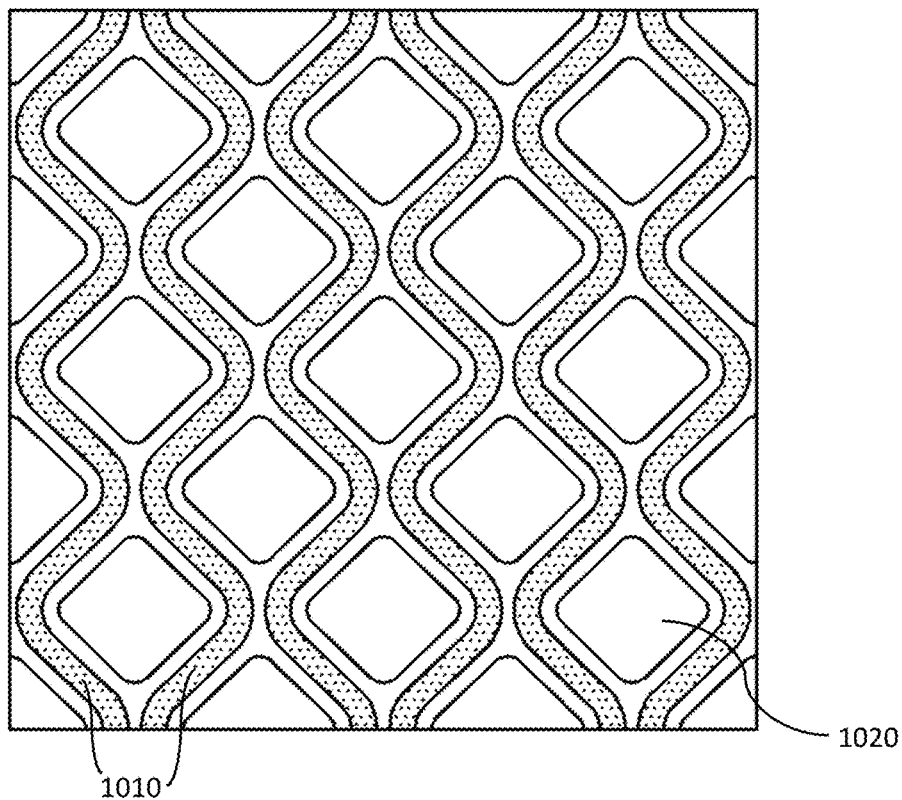
FIG. 9 shows a configuration of feedlines in the second pixel distribution layout according to a preferred embodiment of the present invention.

FIG. 9 shows feedlines 1010 in a preferred embodiment of the present invention in a representative portion of the OLED display panel with the second pixel distribution layout. In the second pixel distribution layout, it is possible that the feedlines are patterned such that adjacent feedlines may pass on two sides of a sub-pixel. As shown in FIG. 9, the sub-pixels 1020 have rounded or cut-off corners such that the feedlines 1010 exceed a minimum separation between the subpixels 1020 (as required to minimize blocked light) while still having sufficient space for two feedlines 1010 and a gap where adjacent feedlines 1010 come closest together. In one preferred embodiment of the present invention, the feedlines 1010 are patterned such that the horizontal distance, as measured on a line between the feedline 1010 and the center of a sub-pixel 1020 is constant around each sub-pixel. Thus, the feedlines 1010 can include curved portions, as shown in FIG. 9. This ensures that optical uniformity at all viewing angles is maintained. In addition, the likelihood of developing a short circuit between feedlines 1010 during manufacturing can be reduced by increasing the spacing between the feedlines 1010 while maintaining a fixed or substantially fixed feedline width and resistance. Furthermore, the feedline configuration shown in FIG. 9 increases (i.e., doubles) the density of feedlines 1010 compared with other configurations. Increasing the feedline density allows for larger panel designs because more feedlines can fit between adjacent touch electrodes and the touch electrode pitch can be reduced.

Preferably for all previous embodiments, the conductive and opaque material of the touch electrodes and feedlines is distributed between sub-pixels with sufficiently high separation from the edge of the sub-pixel that no light which would otherwise be directly emitted from the display is blocked, and therefore the brightness of the emitted light for high polar viewing angles is not reduced.

It should be understood that the foregoing description is only illustrative of preferred embodiments of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A display device comprising:
    a display panel including a plurality of sub-pixels;
    a plurality of touch sensor electrodes that are made of a conductive and opaque material that is located directly on the display panel and overlaps a portion of the display panel in between a portion of the plurality of sub-pixels, the plurality of touch sensor electrodes being routed to a touch sensor controller;
    an enhancement electrode that is made of the conductive and opaque material, connected to the touch sensor controller and driven at a reference voltage, and overlaps a portion of the display panel in between a portion of the plurality of sub-pixels that is not overlapped by the plurality of touch sensor electrodes;
    a first feedline that is made of the conductive and opaque material that is connected to the plurality of touch sensor electrodes, overlaps a portion of the display panel in between a portion of the plurality of sub-pixels that is not overlapped by the plurality of touch sensor electrodes and the enhancement electrode, and routes the plurality of touch sensor electrodes to the touch sensor controller; and
    a second feedline that is made of the conductive and opaque material that is connected to the enhancement electrode, overlaps a portion of the display panel in between a portion of the plurality of sub-pixels that is not overlapped by the plurality of touch sensor electrodes, the enhancement electrode, and the first feedline, and routes the enhancement electrode to the touch sensor controller, wherein
    a total distance between adjacent touch sensor electrodes of the plurality of touch sensor electrodes is predetermined such that the adjacent touch sensor electrodes are capable of being simultaneously sensed when the enhancement electrode is driven.

2. The display device of claim 1, wherein the enhancement electrode increases an electric field projected from the plurality of touch sensor electrodes.

3. The display device of claim 1, wherein the plurality of touch sensor electrodes, the enhancement electrode, the first feedline, and the second feedline overlap only a non-emissive region between the plurality of sub-pixels.

4. The display device of claim 1, wherein the plurality of touch sensor electrodes, the feedline, and the touch sensor controller together measure a self-capacitance of the touch sensor electrode.

5. The display device of claim 1, further comprising a dummy electrode made of the conductive and opaque material and overlapping a portion of the display panel in between a portion of the plurality of sub-pixels that is not overlapped by any of the plurality of touch sensor electrodes, the enhancement electrode, the first feedline, and the second feedline.

6. The display device of claim 1, wherein a coverage of the conductive and opaque material in a region of the display panel including the feedline and the enhancement electrode is between about 50% and about 150% of a coverage of the conductive and opaque material in a region of the display panel including the plurality of touch sensor electrodes.

* * * * *